J. SACHS.
PROTECTIVE CASING FOR ELECTRIC SERVICE CONNECTIONS AND METER DEVICES.
APPLICATION FILED JAN. 21, 1915.
1,245,036.
Patented Oct. 30, 1917.
4 SHEETS—SHEET 2.
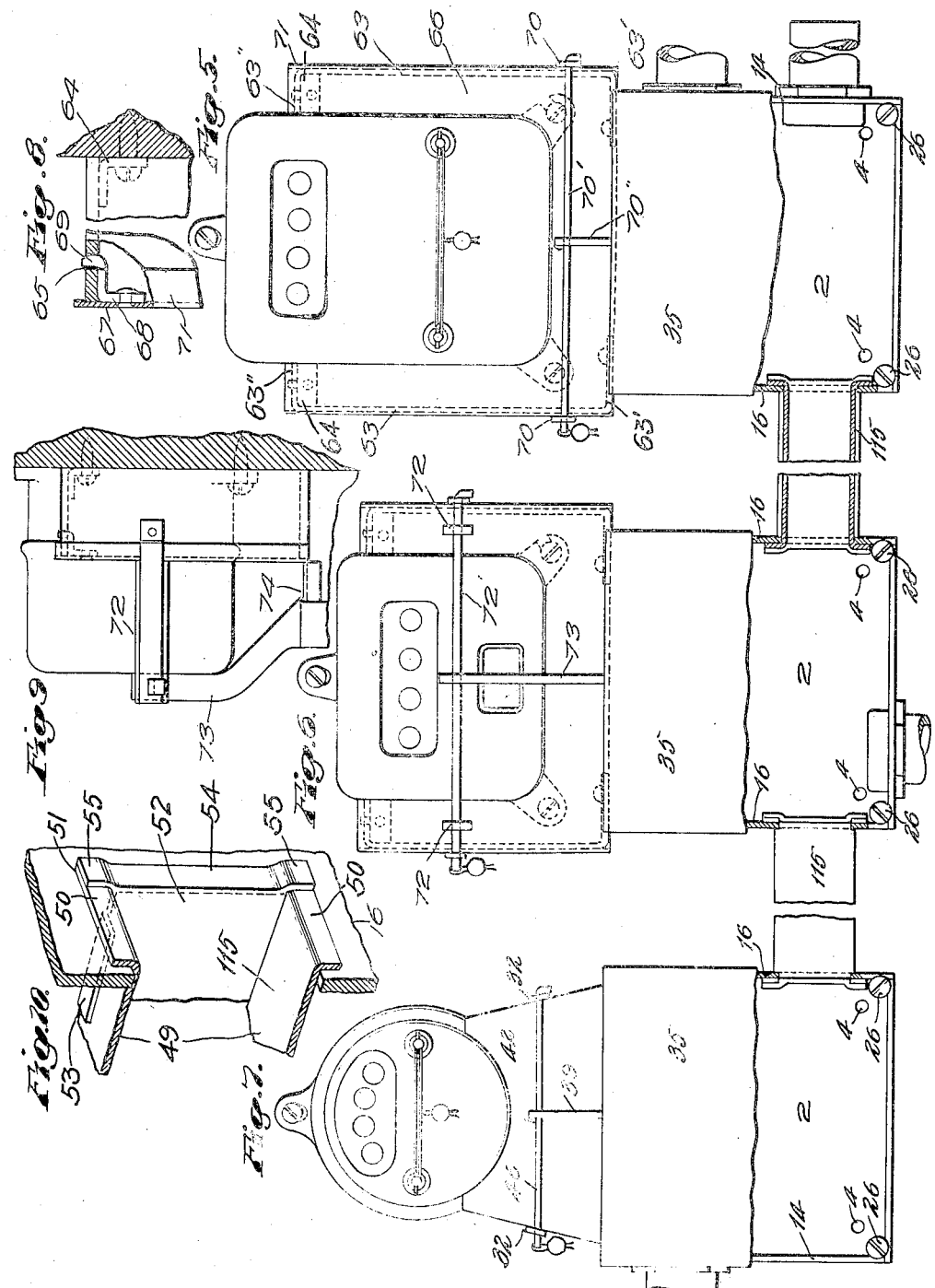

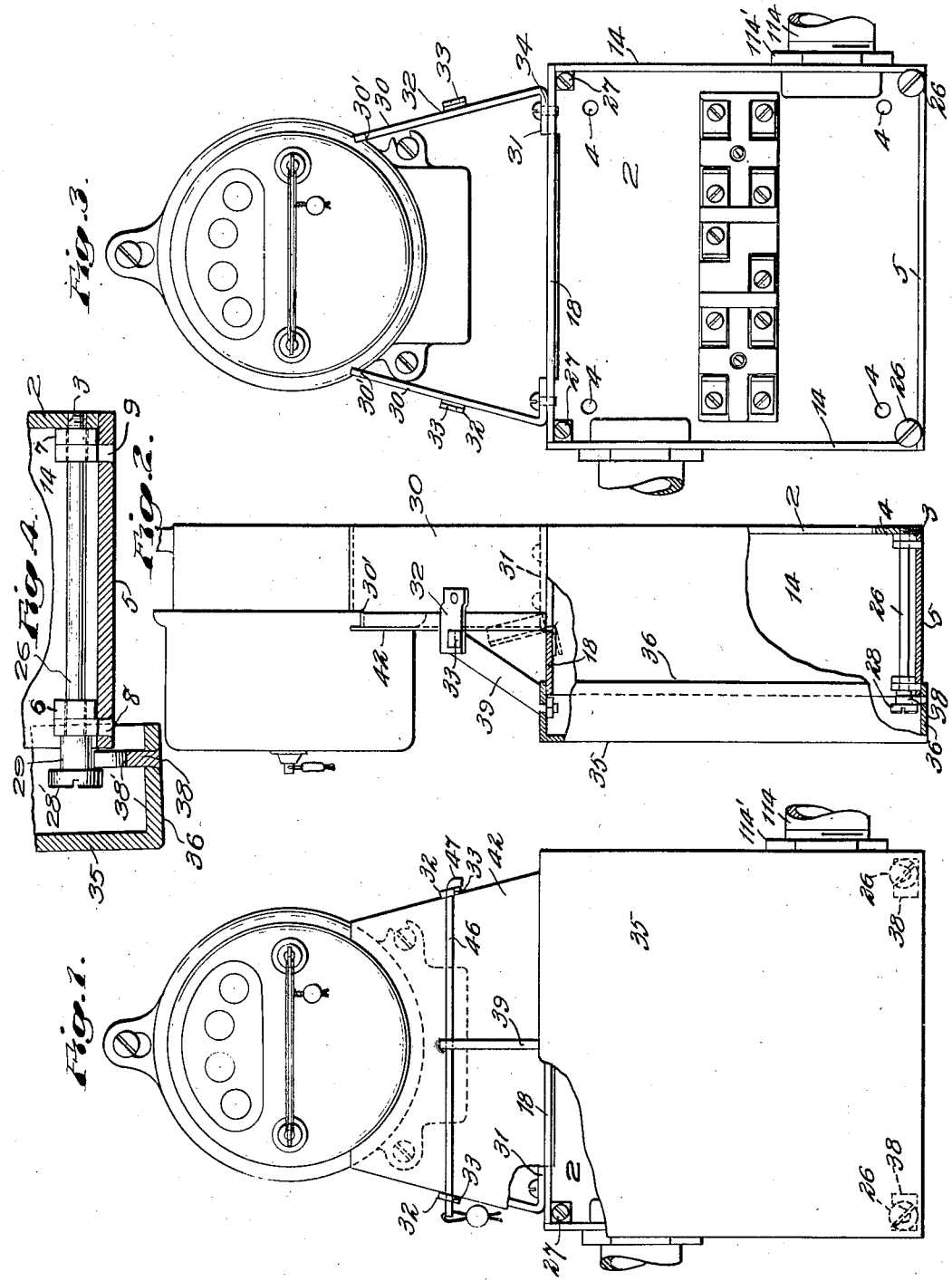

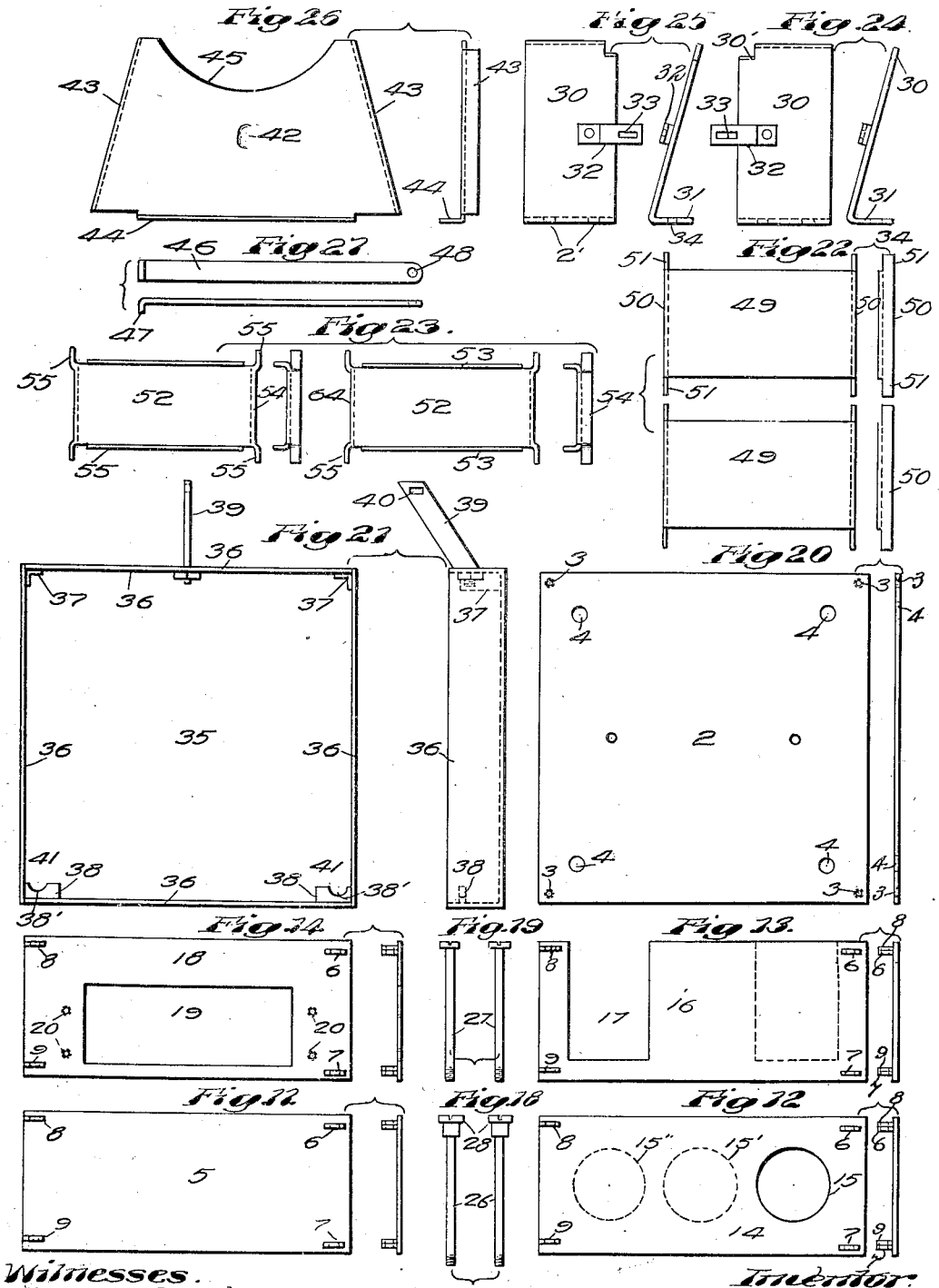

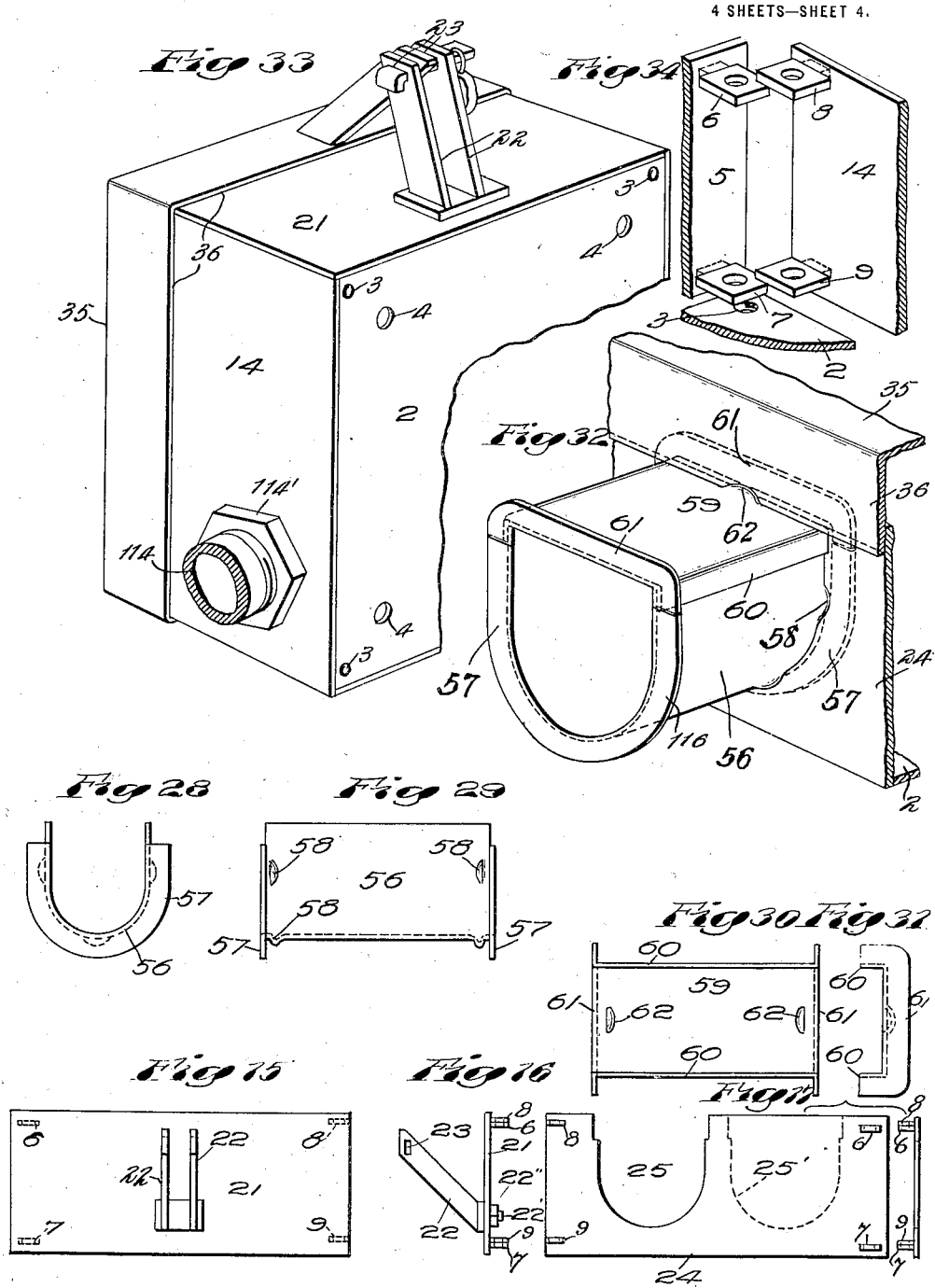

UNITED STATES PATENT OFFICE.

JOSEPH SACHS, OF HARTFORD, CONNECTICUT.

PROTECTIVE CASING FOR ELECTRIC SERVICE CONNECTIONS AND METER DEVICES.

1,245,036.  Specification of Letters Patent.  Patented Oct. 30, 1917.

Application filed January 21, 1915. Serial No. 3,491.

*To all whom it may concern:*

Be it known that I, JOSEPH SACHS, a citizen of the United States, residing at Hartford, in the county of Hartford and State of Connecticut, have invented certain new and useful Improvements in Protective Casings for Electric Service Connections and Meter Devices, of which the following is a specification.

My invention relates to what may, for convenience, be called a "protective casing for electric service connection and meter device."

I aim to produce by my invention a protective housing, casing, box or covering for service connection and meter devices, such as for instance, the service meter testing and connection block of my aplication No. 877,113, filed December 14, 1914, and to arrange such casing, box, or housing, so that it not only provides a protective casing or housing for the block mentioned, or any other similar device, but also a complete protective housing, casing or inclosure for the wires extending to the meter, and I so arrange and combine the parts that I obtain great flexibility in the general positioning and arrangement of the various pipes, meter and conductors entering and leaving the box, or associated therewith, relatively to each other. Furthermore, my protective casing for meter and service connection devices is not an all made up and unalterable entity, but is composed of associable parts which can be combined and firmly held together in a complete composite whole, and arranged to provide any desired relative positioning of the different elements, parts, pieces or members associated together and coacting with each other to form the complete casing. In addition another advantage is due to the fact that by my peculiar construction and arrangement of the various parts, I am enabled to lock and seal both the cover of the main inclosure, casing or box and the meter adapter extension inclosure by a single sealing and locking device. If desired I may also arrange the sealing or locking feature of my protective housing or casing so that not only are the main and meter adapting portions of the complete housing secured and sealed with a single seal, but the meter cover is also sealed at the same time, so that instead of using two or three seals, I accomplish the entire result with only one.

The great flexibility and adaptability, aside from the other advantages which are inherent in my invention, is due to the fact that my protective casing or housing is of what may be called the collapsible type. That is, the complete housing, both so far as concerns the main part and meter adapting part or extension, are made of separate parts, or as they may be called plates, slabs, sides or walls, each of which is an interchangeable unit associable with other units in any desired combination to produce when completely assembled, the desired whole, with such relationship of openings for pipes, conductors, meters, etc, as may be desired.

In connection with the meter adapter portion of such protective casings or housings it may be stated here that on account of the great variety of meter shapes and sizes, this part, element or member of the complete protective housing device must be made in different shapes, styles and sizes to be properly adapted to suitably connect with the different meters. For instance, there are round meters of different diameter, square meters, oblong meters, oval meters and other shapes of meters. The ordinary adapter as provided with the all made up main casings, boxes or housings are also formed up completely and consequently are bulky and cumbersome, as well as expensive. Inasmuch as the meter adapter portion or extension of my complete protective casing or housing is also made of collapsible parts or pieces, similar advantages are also obtained as in the case of the collapsible plates, sides, slabs or wall parts of my main housing.

Referring to said drawings:

Figure 1 is a front elevation of a meter and service device protective casing involving my invention, a portion of the casing being broken away and the meter being shown in place.

Fig. 2 is a side elevation of the said casing as seen from the right in Fig. 1, a portion of the casing being also broken away.

Fig. 3 is a front elevation with the covers of the box and adapter removed.

Fig. 4 is a detail view in section of a lower end corner of the main box.

Figs. 5, 6 and 7 are front elevations corresponding practically to Fig. 1, showing different forms of adapter.

Fig. 8 is a detail view in section showing a cover hinging corner of the meter adapters illustrated in Figs. 5 and 6.

Fig. 9 is a side elevation of the meter adapter extension of Fig. 6 illustrating a sealing construction.

Fig. 10 is a perspective view of the main casing of Figs. 5 and 6 interiorly thereof showing a trough.

Fig. 11 is an inside face and edge view of a wall plate.

Fig. 12 is a like illustration of a conduit holding plate.

Fig. 13 is a similar illustration of a trough holding plate.

Fig. 14 is a like view of a meter adapter holding plate.

Fig. 15 is a plan view of a preliminary or non-serving plate.

Fig. 16 is an edge view of said preliminary or non-serving plate.

Fig. 17 is an inside face and edge view of a different form of trough holding or receiving plate.

Fig. 18 is a detail of a pair of side plate coupling and connecting screws.

Fig. 19 is a similar view of another pair of side plate coupling and connecting screws.

Fig. 20 is a detail in top plan, and edge view of a bottom plate.

Fig. 21 is a view in front and end elevation of a cover for the main housing.

Fig. 22 is an illustration of the side plates of a collapsible trough.

Fig. 23 is a plan and edge view of the top and bottom plates of a collapsible trough.

Fig. 24 is an elevation and edge view of a side wall of a meter adapter.

Fig. 25 is a like view of the other wall of said adapter.

Fig. 26 is a similar view of the cover of said meter adapter.

Fig. 27 is a front and side view of a cover sealing and locking member.

Figs. 28 and 29 are views at right angles to each other of the main or body portion of a non-collapsible wire trough.

Figs. 30 and 31 are top plan and end elevations respectively of a cover for said non-collapsible trough.

Fig. 32 is a perspective view of a non-collapsible trough in position, a portion of the box or main casing being shown.

Fig. 33 is a perspective view of the main box or casing with the preliminary or non-serving plate in position.

Fig. 34 is an inside perspective view of adjacent end portions of complemental side plates and bottom of the main housing.

Like characters refer to like parts throughout the several views.

I have shown and illustrated in Figs. 11 to 27 inclusive, a complete set of parts, members or pieces, each of which is in itself a separate unit, and which may be assembled in a variety of arrangements to form a complete protective casing, including the main and meter adapting parts or portions for a certain style of meter, and with a certain style of wire trough and adapted to connect with the necessary conduit pipes or bushings. It will be understood that while I have shown in such detailed manner the meter adapting parts for one style of meter adapter or extension suitable for a round type of meter, that other styles of meter adapter or extension are shown assembled in the other figures, such as for instance, Figs. 5 and 6; and there are also many other shapes and conformations of meter adapting parts, these depending entirely upon the style, type and size of meter. I have also shown in Figs. 28 to 31 the non-collapsible trough members, and in Figs. 22 and 23 the parts or units of a collapsible form of trough; but many other designs and conformations of trough, both collapsible and non-collapsible are possible.

In order that the various parts, units or members of my collapsible protective service connection and meter device casing, housing, or box may be understood, before discussing the general assembly or make-up of a complete structure by association of such of the parts as may be desired to produce a certain arrangement of complete protective casing, I will first describe each of the several parts or elements shown. I may here state that the various parts are, with the exception of the screws of Figs. 18 and 19, all preferably made of sheet or strap metal, such as iron or steel, and that if desired these parts may be coated with some covering such as paint, japan or enamel to protect them from rust, or they may be otherwise treated.

The casing involves in its make-up a suitable foundation, back or base member, the plate 2 (shown in detail in Fig. 20) see also for example Figs. 1, 2, 3, 5, 6, 7 and 33 answering satisfactorily in this connection. Said plate is represented as rectangular and as having a threaded hole 3 Figs. 20 and 33 adjacent to each corner, these holes being adapted to receive the threaded portions of screws as will hereinafter appear. In addition to the threaded holes said plate 2 has several plain or non-threaded holes 4, Figs. 20, 33, 1, 2, 3, 5, 6, 7, etc., suitably positioned to receive screws or other means by which said plate 2 can be fastened in place to a wall or equivalent structure and has other holes positioned to receive screws or the like in position employed for fastening the device inclosed in the box. While the foundation or base member of the casing is shown as being square, it may as will be inferred, be of other shape as may the other parts coöperative therewith.

The outer walls, slabs, plates or members of Figs. 11 to 17 inclusive, are all of the same outline, dimension and shape which similarity is possible, by virtue of the fact that the base plate 2 is square, a decided advantage arising from this on account of the fact that the outer walls may be placed in any position on the base plate. The outer walls of the casing of which in the construction shown there are four, differ from each other only in the aperture, cuts or recesses therein which are of such nature as to accommodate the different fittings, attachments, extensions, pipes, etc., to be connected with the casing or box. Each of the wall sections or plates has secured thereto in proximity to each corner a perforated connecting or coupling finger indicated throughout the several views by 6, 7, 8 and 9. It should be noted that the preliminary or non-serving wall section or plate of Fig. 15 is viewed from the exterior, the wall sections or plates of Figs. 11, 12, 13, 14 and 17 being viewed from the interior. The plain wall plate 5 shown in detail in Fig. 11 is rectangular, being oblong in form, having in proximity to the upper right corner the finger or projection 6 and in proximity to the lower right corner the finger 7. The outer sides of the two fingers or projections 6 and 7 of said plate 5 are spaced from the adjacent edge of said plate a distance equal to the thickness of said plate 5 which is the same as that of the companion wall plates. The distance from the lower surface of the finger or projection 7 to the lower edge of said plate 5 is practically the same as the thickness of the base plate 2, so that when the lower surface of said finger 7 abuts against the inner surface of the plate 2, the lower edge of the plate 5 is substantially flush with the outer surface of the plate 2 as shown for instance in Figs. 2, 4 and 33. The upper surface of the finger or projection 6 is so placed that the distance from said upper surface to the upper edge of said plate 5 is equivalent to the thickness of the base plate 2 plus the thickness of each of the fingers. The fingers or projections 8 and 9 have their lateral surfaces flush with the adjacent edge of the plate 5.

The projection or finger 8 is spaced from the upper edge of said plate 5 a distance equivalent to the thickness of the plate 2. The finger or projection 9 is set from the lower edge of the plate 5 a distance equal to the thickness of the plate 2 plus the thickness of each of the fingers. In other words, the fingers 7 and 8 are spaced equal distances respectively from the bottom and top edges of the plate, while the diagonally opposite fingers 6 and 9 are separated equal distances respectively from said top and bottom edges. It will be understood that I have specifically described the plate 5 and the disposition of its several inwardly projecting flat fingers or projections. The relation of the fingers of the other plates, which other fingers bear identical characters, is the same. There are four wall plates denoted respectively by 5, 14, 16 and 18 (see Figs. 11 to 14 inclusive). These several wall plates present what might be considered the sides and top and bottom of a casing conditioned for service. In addition to these plates I may use at times a non-serving plate 21 shown in Figs. 15 and 16. The plates 5, 14, 16 and 18 are viewed from the interior, while the plate 21 is shown from the exterior, the fingers 6 to 9 inclusive in said Fig. 15 being in dotted lines and being the reverse of those shown in Figs. 11 to 14 inclusive.

The part 14 (Fig. 12) as illustrated serves as a conduit, tube or pipe receiving plate having a circular perforation or hole 15. The perforation or hole 15 is shown as being located close to one end of the plate 14. I may as shown by dotted lines in said Fig. 12 have other holes as 15' and 15''. It is intended in practice that the conduit pipe whether containing the service conductors or the load conductors or any other be associated with the plate 14 in any manner well-known in the art, an arrangement for this purpose being illustrated in Figs. 1, 3 and 33 in which a so-called outlet bushing 114 and check nut 114' are used to clamp the particular conduit or pipe to said plate 14. Ordinarily when only the service conductors or pipe enters the box, then only one hole as 15 (Fig. 12) need be formed in said plate 14. There may be cases where it is desired to have the service pipe enter the casing and the load pipe leave the casing from the same wall, and in this event the plate 14 or its equivalent will have two suitably positioned holes as 15' and 15'' (Fig. 12). It will also be evident that, inasmuch as a pipe containing the service conductors must be brought to the box, and another containing the load conductors from the box, in the ordinary combination of the parts in the organization of a complete casing or housing, two of such plates as 14 may be utilized in the construction of the box, one for the service pipe and the other for the load pipe, unless as intimated it is intended that both pipes be connected with the same plate. The plate 16 (Fig. 13, for instance) constitutes a collapsible-trough holding or receiving member having as shown the rectangular notch or slot 17 which as shown is oblong and as opening into the upper edge of said plate 16. The shape of the slot, however, is not an essential matter. This notch or slot is intended to receive and hold the collapsible type of trough 115 which is usually made rectangular a portion of the trough being shown in perspective in Fig. 10 and the parts of which are shown separately in Figs. 22 and 23. These troughs when employed are adapted to connect two or more casings when the same are banked or grouped together.

The plate 18 shown in detail in Fig. 14 constitutes a meter adapter or extension wall member having the opening 19 adapted to provide for communication between the main housing and the meter adapter housing and being intended in the present instance for the passage of wires which extend to and from the meter. This plate 18 may as shown have one or more suitably positioned tapped holes 20 to receive screws by which the meter adapter casing can be mounted in place. The complete housing involves a main casing, housing or box in which a service connection and meter testing block or something of other character is mounted and an auxiliary casing or housing with which the meter is associated. As will be clear the main housing comprises a foundation or back plate as 2, one or more plates as 5, one or more plates as 14, one or more plates as 16 and one or more plates as 18, although generally but a single plate such as that numbered 18 is utilized in the construction of the main box. Prior to the installation of the meter as for instance when no service connection has been made, the main box or housing will be provided with a preliminary or non-serving wall member such as the plate 21 shown in detail in Figs. 15 and 16, said member or plate 21 as shown having rigid with it the parallel sealing arms 22 slotted as at 23 at their outer ends. As shown, these sealing arms 22 project from the plate 21 and are provided with studs 22' extending through perforations in said plate 21 and threaded to receive the securing nuts 22''. The purpose of this plate 21 is to seal up the main box or casing before the meter has been installed. This non-serving or preliminary wall member 21 is shown in operative position in Fig. 33. When a meter is to be installed the plate 21 is removed and a meter adapter plate as 18 substituted for it. In Fig. 17 I have shown a trough holding or receiving wall member such as the plate 24 slightly different from the plate 16 already described, the only difference being that the plate 24 has a curved slot as 25 to better adapt it to receive a non-collapsible or two-piece trough 116, (Fig. 32) such as illustrated in Figs. 28, 29, 30 and 31.

Any desirable means may be provided for removably connecting the wall members or plates with the base member, there being in the construction shown four of such interchangeably associated wall members. The novel connecting finger construction possesses, however, particular advantages for this purpose as will hereinafter appear. For the purpose of connecting to the base member or plate 2 the several wall members, I have shown four screws, two of them denoted by 26, being shown in Fig. 18 and the other two denoted by 27, being shown in Fig. 19. The heads of the screws 26 have cover engaging or hooking portions or flanges 28, the heads of the two screws 27 being plain. The threaded portions of the four screws are adapted to engage in the threaded holes 3 in the base member or foundation plate 2.

It will be evident from the description of the several wall members or plates such as 5, 14, 16 and 18 with their perforated coupling or locking fingers or projections as 6, 7, 8 and 9 and the peculiar disposition of these fingers on each plate relative to the four edges thereof, that since all the wall members or plates are of the same length and width, and since all of the fingers are similarly disposed on the respective plates and that also since the base or bottom plate 2 is square with each side of the same length, that any wall member may be placed on any side of the base plate and coupled together through the agency of said fingers and the four screws 26 and 27 in any desired combination. For instance, the plate 5 may be placed on the lower edge of the base plate 2; the plate 14 may be placed on the right edge of said base plate and a second plate as 5 may be placed on the left edge of the base plate while a plate as 18 may be placed on the upper edge of the base plate or this relation may be radically varied.

In order to combine the wall members to form the four side walls of the main portion of the complete casing or housing, the plates that may be selected will be positioned and when so positioned it will be found that a finger as 7 will be under a finger as 9, and a finger as 6 will be under a finger as 8, the fingers 7 and 9 overlapping and abutting, and the fingers 6 and 8 overlapping and abutting, the holes or perforations of the respective fingers being in alinement, at which time the several screws as 26 and 27 are passed through the alined pairs of holes and firmly screwed into the threaded holes 3 of the base plate. In assembling it is usual to first mount two plates, then a third and finally the fourth, and after the four wall members have been connected there will be produced a substantial and secure structure, presenting a coverless box body.

I have shown in Fig. 34 two wall plates as 5 and 14 about to be moved into abutting and coacting relation with each other and with the base plate 2. It will be noted that the lower finger 7 of the plate 5 rests on the base plate 2, while the finger 9, of the plate 14, will, when said plate is moved into proper position, rest on the finger 7, while at the same time when the two plates 5 and 14 are properly positioned, the finger 8 will overlie the finger 6 at which time the perforations in the fingers 7 and 9 will be in line and the perforations in the fingers 6 and 8 will be in line to enable the introduction of either a screw as 26 or a screw as 27, the particular screw to be used depending upon whether a cover is to be initially connected, hooked, or engaged with a corner made as just set forth.

The meter extension or adapter side walls 30 of duplicate construction and which when assembled are intended to hug or embrace the meter, and shown in detail in Figs. 24 and 25 are such as would be adapted for use with certain styles and sizes of round meters such as illustrated for example in Figs. 1, 3 and 7. Each of these side walls 30 generally made of sheet metal has a foot, base or connecting or securing portion 31 extending at an angle from one end of the body thereof. One corner of each of the walls or plates 30 may be notched as at 30' to receive the meter. Connected with the wall members or plates 30 are sealing bolt holding or receiving extensions 32 which project outwardly from the outer edges thereof and which are shown having holes or slots as 33 to receive a bolt. The inwardly extending feet 31 have holes 34 (Figs. 24 and 25) to aline with holes as 20 in a plate as 18 (Fig. 14). When the wall members 30 are mounted their rear edges will be in the plane of the rear surface of the foundation member 2 and also with the rear edge of what is for the time being the top wall member of the main box of the complete housing as shown for instance in Fig. 2; Figs. 1 and 3 also among other views show the relationship of this part. It will be noted that the side walls 30 of the meter extension casing or housing as illustrated in Figs. 1 and 3 for instance, extend on upwardly converging angles, but this is not material as will hereinafter appear.

The cover for the main casing comprising a back and four walls of suitable nature, may be of any desirable character, although that shown in detail in Fig. 21 answers satisfactorily in this connection, said cover being denoted by 35 and being usually made of sheet metal and having along its four sides or edges the inwardly extending flanges or extensions 36 bent from the body of the cover and extending approximately at right angles to said body, the ends of the flanges abutting. In two of the corners of the cover 35 there are secured angular cover stops 37 and in the two other corners are secured the hinge catch or hook pieces 38 grooved as at 38'. On the sealing side of the cover 35 there is provided a sealing arm 39, this arm 39 being supported by what is the upper flange 36 in Fig. 21 held in position in practically the same manner as the sealing arms 22 which I have already described. The sealing arm 39 has near its free end the hole or slot 40 to receive a sealing member such as a bolt as will hereinafter appear.

It should be noted in the construction shown that the catch or hook pieces or hinge members 38 should coact and interlock with the flanged heads of the screws 26 as shown for instance in Figs. 2 and 4. That part of the cover 35 equipped with the pieces 38 may be considered the hinging side thereof. In Fig. 4 I have shown the cover 35 in readiness to be applied, the notches or grooves 38' of the hinge catch or hook pieces being directly under the cylindrical bodies 29 of the heads of said screws 26. On the movement of the cover 35 upward, in Fig. 4, the bodies 29 will seat in the notches or grooves 38 and the flanges 28' will overlie the inner faces of the catch or hook pieces 38 as shown for example in Fig. 2, the cover having in the meantime been pushed down or fully closed, so that the wall members of the main housing or casing will be comparatively snugly received within the four lips or flanges of the cover 35. The stop pieces 37, when the cover is positioned, abut against the body of the main casing, the slot or hole 40 of the sealing arm 39, when the cover 35 is positioned, being between the sealing arms 22 and the two slots 23 and slot 40 being in alinement provided there be a non-serving wall member or plate 21 acting for the time being as the top wall of the main casing or housing. If there be no preliminary or non-serving member in position, but instead a meter adapter casing, then the slot or hole 40 of the arm 39 will be in line with the slots 33 of the sealing arms or extensions 32. It will be clear, of course, that the heads of the screws 26 project out of the coverless body of the main housing or casing as shown in Fig. 4 an extent sufficient to receive the catch or hook pieces or hinge members 38 in the cover 35, the flanges or locking portions 28' of the screws 26 being disposed in the cover 35 when the latter is positioned as shown best in Fig. 2.

The cover 42 (shown in detail in Fig. 26) for the meter adapter or meter extension portion of the complete housing, is of a style and shape to coact with and fit over the extension side walls 30 (Figs. 24 and 25). It consists of a sheet having the side wall overlapping lips 43 and the hinge lip 44. The circular cut or notch 45 is provided so that the meter extension or adapter cover at this edge closely conforms to the contour of the meter casing or cover. In order to place the cover 42 in position that it may coact with the meter adapter or extension chamber side walls 30, the hinge lip 44 is inserted into the slot or opening 19 of the plate 18 (Fig. 14) and hooked over the inner wall of said slot 19. When so hooked the cover 42 is swung inward until it abuts against the front edges of the adapter side walls 30 at which point the lips 43 will overlap said side walls 30. This arrangement, disposition, and positioning of this adapter cover in relation to the adapter walls and the main box wall is shown in Figs. 1 and 2. The swinging into position of the adapter cover, and the manner in which it is hooked into the plate 18 are indicated by dotted lines in Fig. 2.

To seal the main cover 35 and the meter adapter or extension cover 42, a single seal bar or bolt as 46 may be provided, said bolt having at one end the head 47, and at the other a seal receiving hole or perforation 48. This bar is easily insertible into and removable from the apertures 33 (Figs. 24 and 25) and the aperture 40 (Fig. 21). It also fits in the same manner the apertures 23 (Figs. 15 and 16). It will be understood that if the meter adapter or extension of the complete housing is in use, it will be necessary that the adapter cover be swung and pushed into position on its walls or sides, and that this closing of the adapter or meter extension chamber may be done before the main cover is put into place. The adapter cover is firmly held in position on its walls by suitable means.

Such devices, including the main cover sealing arm, the meter adapter or extension sealing projections, and the adapter cover, as well as the sealing bar or bolt, are as described adapted to coact so that the one bolt seals the main and the adapter compartment covers; the meter itself requiring a separate seal. The relationship of these parts, and the manner in which the covers are interlocked and sealed, is shown in the illustrations of Figs. 1, 2, 5 and 7. The adapter as shown in Fig. 5, while of somewhat different shape and outline, and provided with a cover operatively connected thereto in a somewhat different manner, is sealed, however, in the same way, that is in combination with and at the same time that the main cover is sealed by a single sealing bar. The construction in detail of this adapter of Fig. 5 will be described hereinafter.

There may be cases where it is desired to connect two installations by a trough or wire duct or pathway extending preferably from one main casing to another, or there may be several meter installations thus connected. There are several types of such troughs which answer the conditions, one collapsible and another non-collapsible. In Figs. 22 and 23 I illustrate the parts of a collapsible trough. In Fig 22 I have shown what might be considered the duplicate side members 49 of such a trough, while the duplicate members 52 of Fig. 23 constitute the top and bottom members of the same, the two side walls being duplicate and the top and bottom members being also duplicate, the members of the respective pairs are interchangeable. The side members or walls 49 of the particular collapsible trough which as will be understood is of rectangular form in cross section, have flanges 50 at their ends, each end of each of said flanges having the projecting portion 51. The top and bottom members 52 have along their sides lips 53 and end flanges 54 bent therefrom and extending respectively oppositely, each end flange 54 being provided with extensions or bent fingers 55. In Fig. 10 I have shown three of the members of such a collapsible trough 115 assembled and supported by a wall member as 16 of the main housing which wall member has an opening or slot to receive the said trough, the two side members 49 and one member 52, serving as a bottom member, being positioned. A trough of this type connecting meter installations is shown in Figs. 5, 6 and 7. It will be evident that the sections or members of this collapsible trough are securely interlocked with each other and with two coöperating main housings or casings. This trough in itself is not claimed herein alone and for this reason is merely shown conventionally.

In order to show the adaptability of made up instead of collapsible forms of attachments or extensions from the main casing or housing, I may provide such a trough as is illustrated in detail in Figs. 28 to 31 inclusive. This non-collapsible form of trough is composed of two parts instead of four and comprises a channeled body portion 56 shown as being U-shaped in cross section and as having at its ends the flanges 57. In addition said U-shaped body has in proximity to the respective flanges, and projecting outwardly therefrom, the positioning stops 58. The cover portion of this trough is denoted by 59 having inwardly extending flanges 60 along its sides and flanges 61 at its ends, complemental to the flanges 57. In Fig. 32 the two parts of this made up trough or wire duct are shown assembled and associated with a wall member as 24 which has an opening as 25 to receive said trough, the flanges 57 and 61 bearing against the inner surface of said wall member 24 while the positioning stops 58 bear against the outer surface of said wall member. The flanges 60 embrace the upper portion of trough proper or body 56.

I have shown in Figs. 24, 25 and 26 the walls and cover parts of a form of adapter, extension or housing for a certain style of meter, these parts being shown assembled and positioned on the main casing or housing and also associated with a meter in Figs. 1, 2, 3 and 7, and I have previously explained that these adapter extensions or meter connecting housings may be of different shapes, sizes and conformations to respectively and properly coact with the various shapes and characters of meters, illustrations of two other shapes of meters being shown in Figs. 5 and 6. The meter adapter or extension of Fig. 5 is very much like that of Fig. 7 so far as concerns the general arrangement of the walls.

Said meter adapter of said Fig. 5 comprises practically duplicate side walls 63 each having at its ends the inward extension 63' and 63'' disposed at approximately right angles to said walls. The lower base, foot or connecting extensions 63' have holes to receive screws by which said walls can be fastened rigidly in place. The upper extensions 63'' have the angular members 64 fastened thereto, one branch of each being adapted to receive a screw as shown in Fig. 8, so that the said walls 63 can be fastened firmly to a wall, board or base upon which the various associated parts are mounted. With the adapter construction shown in Figs. 5, 6 and 8 it is desirable, due to the greater length and greater liability of said adapter to be bent out of shape, to provide some such means for holding down the upper or meter abutting ends the upper extensions 63'' answering this requirement.

Somewhere close to the outer edges of the upper extensions or bends 63'' they have formed therein apertures 65 as shown clearly in Fig. 8. The cover for the meter extension consists of a plate or sheet 66 having a portion cut away or slotted to receive and snugly fit around or conform to the meter casing and also provided with the lips or flanges 71 to fit over the side walls. Fastened to the cover 66 by riveting or otherwise at opposite sides of the meter are angular members 68 provided with projections 69 to fit the apertures or openings 65. Each of the side walls 63 has fastened to it the slotted projection 70 to receive a sealing arm or bolt as 70' which also extends through a slot in the sealing-arm 70' extending from the cover of the main housing as shown in Fig. 5. To place the adapter cover of Fig. 5 on the meter adapter or extension, the projections 69 are hooked into the apertures 65 and the cover plate 66 is then swung down, so that its lower portion passes over and against the upper wall member of the main casing or housing, the side flanges or lips 71, of the cover 66, when the latter is closed, overlying the outer surfaces of the two walls 63, and when this condition is obtained the sealing member or bar 70' is pushed through the alined slots of the two arms 70 and the arm 70''.

The meter adapter or extension housing, compartment, casing or chamber of Fig. 6 is, so far as its general conformation and contour is concerned, substantially like that of Fig. 5, differing therefrom, however, in size, and also in the fact that it in addition to being provided with the features of the meter adapter or extension casing of Fig. 5, it is also provided with an additional feature whereby the cover of the meter is sealed, as well as the main cover and the adapter or meter extension cover of the casing or housing by a single seal. This is accomplished by providing posts, extensions, arms or projections like 72, one of which is secured to the adapter cover on each side of the meter. The upper outwardly extending or free ends of the parts 72 each have an aperture, which when the adapter cover plate is seated on the side walls, is in alinement with the hole in the main cover sealing arm 73 and the holes in the projections from the adapter walls. Consequently a sealing bar, rod or bolt 72' passed through these holes and secured against removal by a seal as shown, will securely lock and hold together the main chamber, housing or casing cover, the adapter cover, and the meter cover as it will be noted that the arm 73 from the main cover is firmly held against the meter cover. There has also been provided in connection with the lower end of this adapter cover plate a bent up portion 74, which projects from the lower end of the main body of the cover plate and extends outwardly, and when the cover of the main casing or chamber is seated in position this projection 74 abuts against the lip of the cover. The adapter cover is, therefore, held in place at this end and cannot readily be bent outwardly.

It will be understood that the triple sealing arrangement of Fig. 6 can be applied to meters like those shown in Fig. 7 or Fig. 5, or any other style of meter, and that the double sealing device like that of Fig. 7 or Fig. 5 can be applied to meter arrangement like that of Fig. 6. While the side walls of the meter adapter extension such as indicated by Figs. 24, 25 and 26 are only fastened at one end and shown associated with the meters of Figs. 1, 2, 3 and 7, yet such meter adapter or extension walls may also be fastened at any other point in a manner similar to that indicated in the meter adapters of Figs. 5 and 6, or in any other equivalent manner.

Having now described the form, construction, design and function of the several different parts, units, elements or members entering into my interchangeable and universally adaptable service connecting and meter device casing or housing, I will now describe some general arrangements in which the parts are associated together to produce certain installation arrangements and combinations.

From the description and illustration of the different parts or members it will be understood that a service connection and meter device casing, housing or box, complete with its main chamber or compartment and the meter adapter or extension chamber housing or compartment, can be made up to suit the requirement of any installation condition; that is, the service may be brought in from any side of the box, top, bottom, right or left; the conductors to the translating devices may be brought out on any side of the box, and the meter can be placed on any side of the box. Also as will be readily seen a single service may enter the box, while two sets of translating conductors may extend from the box. In order to provide any combination of relative arrangement of the service conductors, the conductors to the consumer's translating devices and the meter, it is merely necessary to have the required base or bottom plate and main compartment or chamber cover with such of the wall plates as that particular condition requires, and to then connect with the box in the manner described the proper meter adapter or extension wall and cover parts suitable for the particular style and type of meter associated with that particular installation.

Let it be assumed now that the service has been brought into a building, but that the consumer's wires have not as yet been brought to the service connection point. The main casing or housing, or what might be called the box proper, would be made up by taking a base plate like Fig. 20, two plain blank plates like Fig. 11, one pipe receiving plate like Fig. 12, and one preliminary or non-serving plate like Fig. 15. These would all be associated together in the manner described by using the screws of Figs. 18 and 19. After being so assembled the box would be secured or fastened to the wall or other support by screws passing through the holes in the base or bottom plate. Instead of first making up the box with its base plate and four side walls and then securing it to the wall, it will be understood that the base plate may be first secured to the wall and the sides then mounted on the base plate. After the service pipe like 75 has been connected to the pipe receiving plate, and the service wires brought into the box, then the main cover would be put into place and seated on the wall plates, the sealing bolt or bar inserted through the apertures in the sealing arms and the seal put on. The service conductors would, therefore, be completely housed in the box and protected from any tampering, and any unauthorized use of current would be prevented.

It will be understood that a meter connection and testing block, or any other type of connection, cut-out, or switch device, may or may not have been also installed in the box, and the wires connected thereto; or this placing of the connection, cut-out, switch or testing block may be done at any other time. Fig. 33 shows a box so arranged, the box being looked at from the base plate, back or bottom side.

Now let us say that the meter is to be installed and the customer's conductors to be brought into the box as, for instance, shown by the illustrations of Figs. 1, 2 and 3. After the sealing bar has been removed and the cover taken from the main casing or box, one of the plain plates and the non-serving or preliminary sealing plate are removed by taking out the necessary screws which interlock the plates, and in place of the plain plate, another pipe receiving or holding plate is substituted, and for the non-serving or preliminary plate a meter adapter or extension holding plate is substituted; the screws being again put into position through the fingers or interlocking projections on the plates. The style of meter is one that requires the type of adapter or extension, the parts of which are shown in Figs. 24, 25 and 26. The side walls may be secured to the meter adapter holding plate either before or after this plate has been secured in position on the base or bottom plate of the main box or chamber. The meter is now put in place on the wall so that it abuts against the upper ends or edges of the adapter side walls and is securely fastened to the wall or support holding the main box. The conductors from the consumer's translating device, carried into the box through the consumer's pipe or conduit, may now be connected to the cut-out, testing block, switch, or other connecting device in the box, and the wires may be carried through the meter extension or adapter chamber from the connection device in the main chamber. When all connections have been properly completed the meter extension cover is put into place in the manner already described, the main box or chamber cover is also seated on its side walls, and the sealing bar or bolt passed through in the manner shown in the drawings and as described, and sealed as indicated, or in any other manner. In the arrangement of Figs. 1, 2 and 3 the service conductor pipe and the consumer's conductor pipe are shown as connected to opposite side wall plates, but it will be understood from what has already been stated that the two pipes instead of being so arranged may both be connected to the same side wall plate as, for instance, indicated in Fig. 5, or the consumer's pipe, instead of being on the opposite side of the box to the service pipe, may be on any other side wall such as, for instance, the lower wall of the box as indicated in Fig. 6. It will be understood that if the type of meter to be used in connection with the particular customer, instead of being like that shown in Figs. 1, 2 3 and 7, be of any other style, then it is simply necessary to use the correspondingly adapted style of meter adapter and extension side walls and cover, such as, for instance, those used in connection with the meters of Fig. 5 or 6.

Another customer is now to be served from the same service. Another protective casing or box is, therefore, installed in proximity to the one already in place, and into which the service conductors have been brought. In order to bring the service conductors into this additional box two trough connecting plates are necessary, one of these being substituted for one of the plates in the first installed box, and the other serving as one of the wall plates of the new box. It will be understood that the trough receiving or holding plate of one box has its trough receiving notch disposed for what might be called right-hand extension of the trough, while the plate of the other box has its notch arranged and disposed for what might be called left-hand extension of the trough; this feature being indicated, in connection with the plates of Figs. 13 and 17 by the continuous and dotted lines outlining the trough notch and also in the assembled casings of Figs. 5, 6 and 7. If there is only one additional customer to be served, it will be understood that the service conductors coming from the first box into the second will stop there, and that the second box will be provided with a trough holding and receiving wall plate and conduit receiving or holding wall plate, (for the customer's conduit), a plain plate and meter adapter or extension holding plate. If, however, another customer is to be served then this second box or casing is provided with another trough receiving or holding plate, which may as indicated in Fig. 6, be disposed oppositely to the other trough holding or receiving plate so that the service conductors may pass right through the box and into a third box, where they may either end or be carried on still farther to additional boxes in the manner described. While it is usual to carry the service wires straight through from one box or casing to the next, where a number are grouped or banked together as has been indicated in Figs. 5, 6 and 7, it will be understood, any other relative arrangement is easily possible by a proper disposition and relative arrangement of the wall plates of each adjoining box. As shown in all the illustrations showing assembled parts in conjunction with a meter, the meter has been disposed above the main box casing or housing, but it will be appreciated that this disposition is not essential, and that the meter may be in any other position relatively to the box, or the troughs or conduit pipes or other connecting parts. It will also be understood that in a group of such meter and service connection device protective casings, the troughs connecting the individual boxes or main chamber casings together may in one instance be of the collapsible type, while in another instance in the same group the non-collapsible type of trough may be used.

I have not shown in the assembled illustrations any instance where the customer's wires are brought out of the box through insulating bushings, as may be permissible where exposed wiring is used. It will be understood, however, that I may provide a plate properly apertured as, for instance, has been shown in connection with the plate of Fig. 12, and fitted with insulating bushings, which plate so fitted with bushings, may be disposed in the proper position as one of the walls of the box, so that the customer's wires may be brought out of the box through these bushings.

From what has been shown in the drawings and above described it will be noted that I have provided a service connection and meter device protective casing, housing or inclosure made up of interchangeably placeable and associable units or parts, which can be associated, combined or coactingly related into a composite protective casing structure to meet practically any condition required of such an appliance. Its use and adaptability is, therefore, universal. The separable individual unit nature or character of the different members or elements, permitting the entire structure to be collapsed, results in advantages already mentioned; but in addition to those stated, attention will also be directed to the fact that the various parts, units, elements or members entering into the various composite combinations may be separately purchased and obtained as needed to fill out any particular requirement or need.

While I have shown only certain conformations of base or bottom plate, main side wall plates, adapted walls, covers, locking and sealing bolts and arms, troughs, etc., it will be understood that I do not in any way intend to limit myself to the particular design and conformation of these parts, nor to the particular method, members or devices used to connect the several parts together to provide a composite serving connection and meter device protective casing or structure. The forms and arrangements shown are, however, well adapted to the purpose, and possess in themselves certain advantageous structural features. The main consideration involved in my invention is to provide a protective housing, casing, box, or inclosure for service connection and meter devices adapted to protect and house the conductors, contacts, and parts of service connection installation, including service conductors, customer's conductors, meter and the necessary connection, cut-out, testing or switch blocks in such a manner that unauthorized tampering and theft of current is guarded against and substantially prevented; and to so construct this protective casing, housing, inclosure or box that it is made up of parts or units or individual pieces separable from each other so that the complete structure is entirely collapsible, and so that the different functioning parts, units, elements, or members may be associated, combined or held together in various available combinations and universal relative arrangements. My invention furthermore embodies the provision in a protective casing, inclosure, housing, box or appliance, whether of the collapsible, separable, variable, combinable, unit, member type or not, the double or triple locking or sealing features, whereby a single sealing or locking device is adapted to serve to lock and seal the two covers of the complete protective casing construcure; that is, the main cover and the adapter cover, or the main cover, adapter cover, and the meter cover.

What I claim is:

1. A protective housing for service and meter connection devices comprising a main housing and an auxiliary housing the latter constituting a meter adapter extension, the main housing having a plurality of sections, means for holding said sections in operative relation with each other and for permitting their separation and reassemblage in different orders without destroying said operative relation, one of the sections having an opening for the passage of a conductor and the auxiliary casing being connected to another of said sections.

2. A protective housing for service and meter connecting devices comprising a knock-down casing having means whereby a conductor can be led into or from the box in different directions and also having means for the connection therewith of a meter adapter extension in different ways.

3. A protective housing for service and meter connection devices comprising a knock-down casing, one section of which has means to lead a conductor into or from the box and another section of which has means for the connection therewith of a meter adapter extension, the sections of the casing being changeable to vary the position of said extension and also the position of the conductor.

4. A protective housing for service and meter connection devices comprising a plurality of plates, and means for holding said plates in operative relation with each other to present the body portion of a box and for permitting their separation and reassemblage in different order and still maintaining said operative relation, one of the plates having an opening for the passage of a conductor and another plate having means for the connection therewith of a meter adapter extension.

5. A protective housing for service and meter connection devices comprising a casing and an extension portion, said casing involving independent plates provided with coacting means whereby said plates may be associated in various relative arrangements, one of said plates being adapted for the passage of the service or load conductors into or from the box and another of said plates being adapted to coact with the extension portion of the complete protective casing.

6. A protective housing for service and meter connection devices comprising a casing composed in part of a plurality of sections and two other sections, either of which two other sections completes the box, one of said other sections constituting a preliminary section, and the other being provided with means for the connection therewith of a meter adapter extension.

7. A protective housing for service and meter connection devices comprising a base member, a plurality of wall members presenting with the base member a part of a box, additional wall members counterparts of the other wall members, and either of which is complemental to the other wall members and by its association therewith completes the wall portion of the box body, one of said additional wall members being a preliminary wall member, while the other wall members is a meter adapter extension connecting wall member, a cover for said box body, and means whereby said cover may be connected with either of said additional wall members when the same is operatively positioned with its complemental wall members.

8. A protective housing for service and meter connection devices comprising a casing, the wall portion of which is made up of sections, one of the sections presenting either a preliminary section or a meter extension section, and a cover for the box provided with means for connecting it with either the preliminary section or the meter extension section when in operative position.

9. A protective housing for service and meter connection devices comprising a casing or box, one section of which is of one of two different types, one type when positioned being adapted to condition the box for preliminary or non-service, and the other having means for the connection therewith of a meter adapter extension, and a cover having means for the connection with either type of section when the same constitutes for the time being a part of the box.

10. A protective housing for service and meter connection devices comprising knock-down wall sections, means whereby said wall sections may be changeably associated and held together to form walls of a casing, a cover for said casing, said means for holding the wall members in operative relation, being also adapted to coact with and hold the cover, and means whereby said cover is also held to one of said wall sections.

11. A protective housing for service and meter connection devices comprising a casing having a knock-down body portion and a cover for the body portion, separate means for holding the cover in place, one means being inclosed by the casing and the other means being exterior of the casing.

12. A protective housing for service and meter connection devices comprising a casing, the body portion of which has interchangeable sections, and a cover for said body portion, said body portion having means inclosed by the same body portion and by the cover for holding said cover in position, and means exterior of the body portion and the cover for also holding the cover in place.

13. A knock-down protective casing for service and meter connection devices comprising separate and interchangeably associable wall members, means for interlocking said wall members approximately at their ends, a cover for said casing adapted to engage with a part of said wall member locking means, and when in place to cover all of the wall locking means, said cover having exteriorly thereof additional means for holding it in position, one of said wall members having means for the passage of a conductor and another having means for the protective connection therewith of a meter.

14. A protective casing for service and meter connection devices, comprising a knock-down casing one section of which has means to lead a conductor into or form the casing and another section of which has means for the protective connection therewith of a meter, said sections of the casing being changeable to vary the relation of the conductor and the meter with the body of the casing.

15. A protective housing for service and meter connection devices comprising a main casing to receive electrical connection devices, and an auxiliary casing extending between the main casing and a meter, a cover for said main casing, a cover for said auxiliary casing, means common to the two covers for sealing them in position.

16. A protective housing for service and meter connection devices comprising main and auxiliary casings, the main casing having means for the reception of service and load conductors, the auxiliary casing being adapted to coact with an electric meter, and means common to the main and auxiliary casings and the meter for sealing the same.

17. A protective housing for service and meter connection devices comprising main and auxiliary casings, the main casing having means for the reception of load and service conductors, the auxiliary casing being adapted to embrace an electric meter, a cover for the main casing, a cover for the auxiliary casing, and means common to the two covers and the meter for sealing the same.

18. A protective housing for service and meter connection devices comprising a casing provided with means for the passage to and from the casing of conducting means and also provided with means for protectively connecting the meter thereto and for permitting its protective placement in various coöperative positions in relation with the casing and in various relations to the means for the passage of the conducting means to and from the casing.

19. A plurality of wall members adapted when assembled to form the wall portion of a casing, a foundation member for said casing, said wall members being provided approximately at their ends with perforated projections, means extending through the perforations of the projections for fastening the same together, said means being also connected with the foundation member to connect said wall portion and foundation member.

20. A plurality of wall members adapted when assembled to form the wall portion of a casing, and a foundation member for said casing, said wall members being provided approximately at their ends with perforated projections, and screws passing through the perforations of the projections and tapped into the foundation member, one pair of screws extending outside the wall portion and having cover holding means.

21. A plurality of wall members adapted when assembled to form the wall portion of a casing, and a foundation member for the casing, said wall members being provided approximately at their ends with perforated projections, and four screws passing through the perforations of the projections and tapped into the foundation member, and one pair of screws extending outside said wall portion and being provided at their extended ends with cover holding flanges.

22. A protective housing for service and meter connection devices comprising a casing having a plurality of wall members separably associable and when associated constituting the body of the casing, one of the members having means for the passage of a conductor and another having means for the protective connection therewith of a meter, the several members being associable in different relations.

23. In a protective housing for service and meter devices, a wall member having means for the passage of a conductor to or from the interior of the housing, another wall member having means for the protective connection therewith of a meter, and means for holding said wall members in various interchanged relation for thus providing for the varying location of a meter with relation to said housing.

24. In a protective housing for service and meter connection devices, wall members, means associated with one of said wall members for the passage of a conductor into or from the housing, means associated with another of said wall members for the protective connection therewith of a meter, said aforesaid means being interchangeably placeable with relation to said housing.

25. A housing for service and meter connection devices having means for the passage into or from the housing of a conductor and also having means for the protective connection therewith of a meter, said housing having further means by which the relation of both the conductor and the meter can be changed with respect to the housing.

26. In a housing for service and meter connection devices, means for the passage of a conductor to or from the housing, means for the protective connection of a meter with said housing, and means whereby the relative position of the conductor and meter to each other and to the housing can be changed to conform to the particular meter installation.

In testimony whereof I affix my signature in presence of two witnesses.

JOSEPH SACHS.

Witnesses:
L. L. MARKEL,
HEATH SUTHERLAND.